United States Patent
Hinson, Jr.

[15] 3,637,436
[45] Jan. 25, 1972

[54] CATHODE MIXTURE CONTAINING A HIGH-STRUCTURE, HIGH-SURFACE AREA CARBON BLACK

[72] Inventor: Fletcher A. Hinson, Jr., Portland, Tex.
[73] Assignee: Ashland Oil, Inc., Houston, Tex.
[22] Filed: May 5, 1970
[21] Appl. No.: 46,569

Related U.S. Application Data

[62] Division of Ser. No. 564,667, July 13, 1966, abandoned.

[52] U.S. Cl. ............................136/83 R, 136/121, 136/137, 23/209.2
[51] Int. Cl. ............H01m 21/00, H01m 13/02, H01m 15/06
[58] Field of Search ..........................136/121, 122, 137, 83; 23/209.2, 209.4; 106/307; 260/763

[56] References Cited

UNITED STATES PATENTS

2,880,122  3/1959  Morehouse et al. .....................136/137
3,408,165  10/1968  Hinson, Jr. .............................106/307

*Primary Examiner*—Winston A. Douglas
*Assistant Examiner*—M. J. Andrews
*Attorney*—Walter H. Schneider

[57] ABSTRACT

A cathode mixture for a cell which contains a furnace carbon black having a surface area (iodine adsorption) of about 600 m.$^2$/gram to about 1300 m.$^2$/gram, a structure level as measured by oil factor of about 250 to about 450 milliliters per 100 grams of carbon, a pH of about 6 to about 10, and an ash content of about 0.5 percent to about 10 percent.

16 Claims, 3 Drawing Figures

Discharge Curve Organic Depolarized System

Legend
△ − Acetylene Black
○ − Product Of Ex. I

PATENTED JAN 25 1972

3,637,436

INVENTOR
Fletcher A. Hinson, Jr.

BY *Walter H. Schneider*

ATTORNEYS

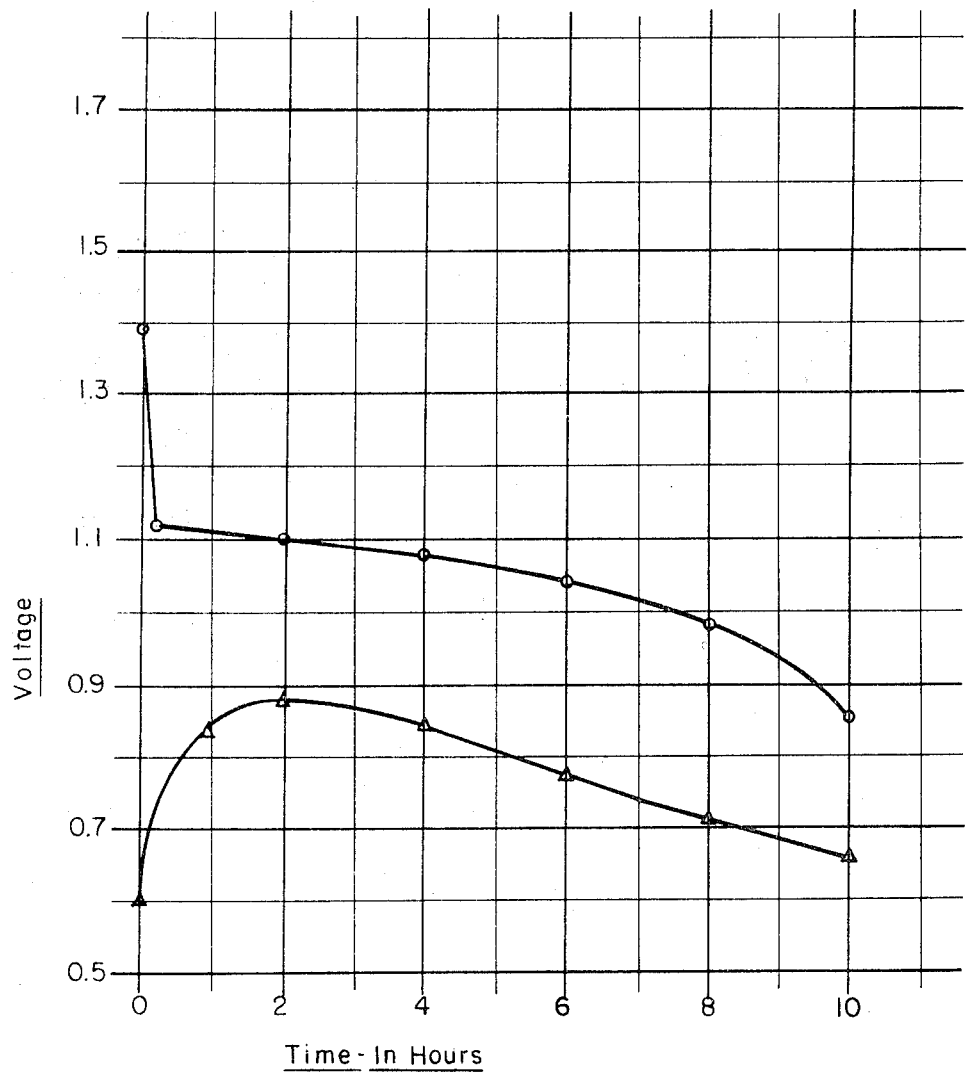

CATHODE MIXTURE CONTAINING A HIGH-STRUCTURE, HIGH-SURFACE AREA CARBON BLACK

This is a division of copending application Ser. No. 564,667, filed July 13, 1966, now Pat. No. 3,574,547.

This invention relates to carbon black. More particularly, it relates to the production of carbon black. Still more particularly, it discloses new and useful carbon black products and elucidates a new and useful mode of controlling the properties of carbon black while it is being produced in accordance with the furnace process.

The well-known channel or impingement process produced a good product, but was wasteful and of limited versatility. Consequently, it has gradually been replaced by the furnace process.

In every carbon black process, a hydrocarbon is the raw material, and it is caused to break down, crack, decompose or dissociate into carbon black and byproducts by the application of heat. The hydrocarbon raw material is commonly referred to as "make" or "feedstock." The necessary heat may be obtained by burning a portion of the feedstock to carbon oxides and water, the remainder dissociating to carbon black and byproducts. Alternatively, heat may be provided by burning some hydrocarbon other than the feedstock. When a separate hydrocarbon is employed to generate heat, it is referred to as "fuel." It is of course possible to burn both fuel and part of the feedstock, and this is usually done—but with moderation.

The furnace process is characterized by a number of features which clearly set it apart from other methods. One such feature is the fact that the process is conducted in a confined zone or zones of limited cross section ranging from a few inches to a few feet across. Hot combustion gases from the burning of fuel and/or feedstock are generated on a continuous basis in the confined zone(s) or in external burners in communication with the zone(s). Sufficiently high rates of combustion are maintained to sustain a very hot (e.g., above 2,000° F.) flow of turbulent combustion gases moving through said zone(s) at very high, e.g., near sonic, velocities. The process is conducted in highly specialized furnaces, known as reactors, of which a wide variety are known to persons skilled in the art. The various reactors differ from one another in such details as the number, shape and dimensions of the confined zone(s), the means for generating and directing the flow of the combustion gases and the means for introducing and directing the feedstock into the hot combustion gases.

Quite apart from being mere soot, the carbon black produced in such reactors is characterized by certain properties which, according to the manner of production, may be present in varying degrees: particle size, surface area, acidity or alkalinity (pH), tint, ash content, modulus, structure and others. Certain combinations of such properties are essential if the product is to be suitable for a given use, e.g., reinforcement of vulcanized rubber, whereas different combinations of such properties are required for other uses, such as utilization as a colorant for ink. Also, specifications for carbon black for a given use change from time to time as changes are made in the materials with which the carbon black must be used. For example, the introduction of a new type of synthetic rubber has at times required an adjustment of one or more properties of the carbon blacks offered to the rubber industry.

A variety of factors determine the extent to which different properties develop in carbon black. Fuel, air and feedstock rates are important. Conditions favoring a higher yield of carbon black tend to develop less surface area in the carbon black and vice versa. The types of hydrocarbons present in the feedstock also have an influence. For instance, all other things being equal, a higher percentage of aromatics in the feedstock will lead to a limited increase in the development of structure in the black. Injection of various additives also affects properties.

The surface area of a carbon black, as employed in this specification and in the appended claims, is the combined measurable surface of all of the particles in a given quantity, e.g., weight, of the black. The surface area of an individual particle is not solely dependent upon its diameter, since such particles vary from the spherical in shape and exhibit surface roughness and porosity to varying degrees. Thus, equal quantities of carbon black having similar distributions of particle sizes may exhibit different specific surface areas (surface area per unit weight). The surface areas of different carbon blacks may be determined by measuring the relative adsorptive powers of equal quantities thereof, since the surface area of each particle determines and is proportional to its adsorptive power. Thus, one known convenient method of measuring surface area is to weigh a sample of black, widely disperse and thoroughly mix the sample in a measured quantity of a solution containing a known concentration of a soluble material, then separate the carbon black and the soluble material adsorbed thereon from the remainder of the solution and measure the amount of soluble material removed from solution by the weighed sample of black. One example of such method will be set forth in greater detail hereinafter. Methods involving adsorption of gases are also known.

High-surface area carbon blacks exhibit desirable coloring and reinforcing powers in addition to high adsorptivity. Accordingly, the art has developed various methods of enhancing or controlling surface area by regulation of the rates at which feedstock, fuel and combustion-supporting gas, e.g., air, are introduced to a reactor. Because such regulation failed to produce enough enhancement of surface area or else enhanced surface area with an undesirably large loss of yield, it was suggested that alkaline earth metals be introduced into and dispersed in the reaction zone of a carbon black reactor at that place where the carbon black reaction commences, e.g., at that place where the feedstock starts to decompose and the carbon black commences to form. Although this technique does permit the production of a carbon black of high surface area in a controlled manner, the technique also has quite marked effects upon the structure of the resultant product.

By the term "structure" as used throughout the specification and claims hereof is meant the degree of that phenomenon exhibited by carbon black particles in associating or clustering to form chainlike, or rodlike, units of varying lengths and geometric configurations. Such formations may occur by virtue of the physical union of numerous particles and/or by virtue of the attractive forces between and among particles. In terms of the former, a minimum or low-structure carbon black is accompanied by a minimum of physical union or "twinning" of particles with a substantial proportion of the particles being discretely divorced each from all the others. As the degree of structure increases, an increase in the number of rodlike carbon black units as well as an increase in the length of such units is evidenced. In terms of the latter, a minimum or low structure results when the attractive forces between and among the carbon black particles decrease in magnitude below the point of interference. As these attractive forces increase, the degree of structure increases as a result of interferences between and among particles.

Structure of carbon black can be observed under an electron microscope, although minor differences in carbon black structure can only be observed by a trained and experienced operator. Structure manifests itself in a number of ways, however, among which is the relationship between structure and oil absorption. Thus, assuming that other variables such as particle size and specific surface area are held constant, the ability of carbon to absorb oil increases as its extent of structure development increases. In effect, the formation of chainlike or rodlike units provides a "framework" of such units within a carbon black/oil mixture which helps hold the resultant mass together and thus offsets the tendency of the mass to become "runny" as more oil is added. The differences in the extent to which two compact masses of loose (as opposed to pelleted) carbon black are able to absorb oil without becoming "runny" is therefore a measure of their relative degrees of structure development, assuming that other pertinent properties are equivalent, or that suitable adjustments have been made for differences in such other pertinent properties. From this phenomenon, there has been derived the oil absorption test for measuring the degree of structure of black in general, this test involves the incremental addition of a standard linseed oil to a weighed quantity of black while working the mixture with a spatula. Oil addition is continued until the mixture reaches a predetermined consistency which constitutes the end point. The quantity of oil per quantity of black is the oil absorption factor and is usually measured in ml./gram, ml./100 grams, or gallons/100 pounds. While the mixing procedure and determination of the end point may vary with each individual conducting the test with corresponding variations in the oil absorption factor, nevertheless, the test is susceptible to reasonable reproducibility when practiced by the same individual and is accepted by the industry as a means for measuring the relative structure characteristics of different carbon blacks.

As indicated above, the employment of alkaline earth metals as an aid to the development of high surface area while conserving product yield has produced, as a side effect, the degradation of structure. Thus, it is apparent that the structure and surface area of furnace carbon black have been oppositely affected by the alkaline earth metals that have been employed. The fact that these properties can vary oppositely furnishes evidence that they are definitely different properties.

Heretofore, high-structure carbon blacks produced by decomposition of ethylene or acetylene have been employed in dry cells of the Le Clanche type. More recently, a special process has been proposed for the production of an oil furnace carbon black which has structure, adsorptive and electrical properties that are at least the equivalent of ethylene or acetylene blacks, the object of such process being to produce a suitable substitute for acetylene blacks in Le Clanche cells.

At present, there is considerable interest in organic depolarized cells. Such cells differ from Le Clanche cells in that the cathode depolarizer is an organic substance. Thus, for instance, it has been proposed to produce organic depolarized cells having a magnesium anode and a cathode which is a mixture of carbon black, magnesium perchlorate and an organic depolarizer such as meta dinitrobenzene. Such cells have the advantage that for each molecule of meta dinitrobenzene which is reduced, 12 electrons are transferred:

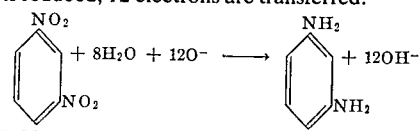

In contrast, for each molecule of $MnO_2$ reduced in the Le Clanche system, only one electron is transferred. The potential advantages of the organic depolarized cell are evident.

Although it has been reported in the prior art that high structure is an essential property of a black suited for use in cells, the art still lacks a comprehensive understanding of the exact combination of properties needed to produce suitable carbon blacks for cells. Two conclusions follow: structure is not the sole property which determines the suitability of a black for cell applications; and a black suitable for use in one type of cell is not necessarily useful in other types of cell. Support for these conclusions is provided by experimental evidence which shows that the same high-structure acetylene-type blacks which have been successfully employed in Le Clanche cells are not suitable for organic depolarized cells. In fact, so far as the present applicants are aware, no consistently dependable carbon black product for organic depolarized cells has ever before been made available to the art. Thus, in view of the potential advantages of organic depolarized cells and the lack of suitable blacks for such cells, a need remains for new carbon black products and processes for such applications.

The principal object of the present invention is to fulfill the above-mentioned need. Still another object of the invention is to produce a furnace carbon black in a furnace carbon black reactor with a surface area in excess of about 600 square meters per gram. Another object of the invention is to produce a furnace carbon black in a furnace carbon black reactor with a structure, as measured by oil factor, of more than about 250 milliliters per 100 grams. A further object is to produce a carbon black product which is characterized by having the foregoing levels of surface area and structure in combination. Yet another object is to provide a method for producing carbon black in a furnace-type carbon black reactor at extraordinarily high levels of surface area while maintaining a high degree of control over the relative extent of development of each of said properties. Another object is to provide a method for introducing alkaline earth metals and mixtures thereof to the reaction mass in a carbon black reactor for enhancing surface area while also enhancing the structure level of the resultant carbon black product. Another object is to produce a furnace carbon black having approximately the particle size of SAF grade carbon black, e.g., about 15–22 millimicrons, but possessing a substantially higher than usual surface area and structure. Another object of the invention is the continuous production of carbon black at a generally constant level of particle size while making substantial variations in the surface area and/or structure of such carbon black. Other objects and advantages of the invention will occur to persons skilled in the art.

Quite unexpectedly, it has been discovered that with a particular class of reactor, it is possible to produce pronounced increases in surface area as well as a high level of structure. The applicable class of reactors is characterized by the ability to carry out a furnace carbon black process, as above described, and by having two distinct chambers or zones separated by a restriction or choke having an opening which has substantially less cross-sectional area than either zone. One of said zones, which will be referred to as the first zone, is fitted with means for providing hot combustion gases therein, either by injecting said gases into said zone from an external burner or by burning both fuel and feedstock in the zone itself with a combustion supporting gas such as air. The means for providing combustion gases is spaced from the position(s) at which the feedstock enters the first zone and is positioned for directing the combustion gases downstream in the first zone along a sidewall thereof and then, at the downstream end of said zone, inward toward the opening through the restriction. There is a means for injecting the feedstock which cooperates with the restriction in producing a substantial dispersion of said feedstock in the hot combustion gases by the time they enter the second zone. The means for injecting feedstock, e.g., a nozzle, includes means for discharging the feedstock as an atomized spray. The feedstock should emanate from the injecting means as a hollow or solid "substantially conical" (e.g., conical, elliptical or polygonal) spray with an average included angle of at least about 60° to about 180°. The injecting means is positioned for directing the spray outward from one or more positions "at" (e.g., on or near) the axis of the first zone and downstream towards the restriction and second zone. The downstream end of the first zone communicates through the restriction with the upstream end of the second zone. Downstream of the upstream end of the second zone is a cooling means. The cooling means may be located within or outside, e.g., beyond, the downstream end of the second zone. The invention is not applicable, however, to those reactors which lack the aforementioned restriction (or "choke" as it is sometimes called) and at the same time employ means for introducing hot combustion gases into the first confined zone tangentially.

Persons skilled in the art are aware of a variety of reactors falling within the above-described applicable class. Such reactors will, to be sure, differ from one another in the exact structure of the means for injecting feedstock and the means for providing hot combustion gases and in the positioning of such means. Other variations will be noted. However, so long as the reactor falls within the above-described class, the invention is applicable thereto. As a consequence of their internal arrangements, the applicable reactors compress the stream of hot combustion gases and hydrocarbon feed as they pass through the restriction and then release them as a turbulent mixture and diminish their rate of flow as they enter the second zone.

In accordance with the invention, a hydrocarbon feedstock oil boiling above about 400° F. is introduced into a reactor of the above applicable class through the feedstock-injecting means; a mixture of hot combustion gases and sufficient oxygen to burn about 20 percent to about 70 percent of the feedstock and to produce a temperature in the reactor of about 3,000° to about 3,400° F. is provided in the first zone; the hot combustion gases are brought into contact with the feed by directing them towards the downstream end of the first zone along the side thereof and then directing the gases inwardly toward the opening through the restriction, the resultant mixture being defined as a reaction mass; the reaction mass is caused to flow through the restriction and into the second confined zone in a highly turbulent condition while a portion of the feedstock burns and another portion thereof is cracked to carbon black and byproducts; cracking of the feed is conducted in the presence of alkaline earth metal dispersed in the reaction mass at a concentration of about 0.2 percent to about 4 percent by weight of feedstock; the feedstock is maintained in said zones and in the presence of said alkaline earth metal for a contact interval of at least about 10 milliseconds and not more than about 70 milliseconds, which time interval is terminated by cooling the reaction mass to a temperature substantially below 3,000° F.

The preferred feedstocks comprise the various petroleum residua obtained in a number of petroleum operations, as e.g., the bottoms derived in a thermal or catalytic cracking of cycle oils and the like. These residua are more commonly referred to as residual oils, pitches or tars and are mainly chemically characterized by exhibiting a high degree of aromaticity, e.g., hydrocarbons containing a hydrogen to carbon ratio less than about 1.25, and also exhibiting relatively high-specific gravity, preferably less than about 10° API. In addition to these preferred types of carbon black producing feedstocks, use can also be made of hydrocarbon distillates such as kerosene, other heavy or light naphthas, recycled gas oils and the like.

It is generally considered desireable to introduce the feedstock in atomized condition. Therefore, when using heavy residual oils it will be found advantageous to preheat them in a manner known to the art prior to their injection into the first zone of the reactor. Preheat temperatures in the range of 400° to 500° F. are common. Best results are obtained when the preheated feedstock is atomized in the reactor at the point of injection, such as by use of an atomizing nozzle. Nozzles are available which will atomize feedstock oils with or without an atomizing fluid, e.g., air, natural gas and so forth.

As explained above, the feedstock is introduced as a substantially conical hollow or solid spray. A preselected feedstock spray angle is employed. The feedstock spray angle may be varied by substituting nozzles which differ from one another in the average included angle in their spray patterns or by employing a nozzle having an adjustable spray angle. A variety of suitable nozzles are commercially available. By selectively varying the feedstock spray angle, it is possible to regulate the structure of the carbon black produced in a reactor of the applicable class. Such regulation is carried out in accordance with the teachings of U.S. Pat. No. 3,222,131, issued Dec. 7, 1965 to K. E. Powell, David C. Williams and the applicant herein. However, for purposes of the present invention, it is necessary that the average feedstock spray angle be at least about 60° in order to obtain the novel products of the present invention. An upper limit of about 180° has been set upon the feedstock spray angle. Generally speaking, the objects of the invention can readily be attained by operating within this upper limit. However, it should be understood that the angle can be increased still further without harm, provided that suitable precautions are taken to avoid coking of the feedstock on the reactor walls.

The hot combustion gases may be generated by the combustion of vaporous hydrocarbons such as those employed as feedstocks, or may be gaseous fuels, natural gas being preferred. Oxygen, which may be in the form of air, oxygen enriched air, gaseous oxygen or other oxygen-containing gas, is supplied to support combustion. Sufficient oxygen is supplied in addition to that consumed by the fuel to burn the indicated amount of feedstock. Burning at least about 20 percent of the feedstock has been found essential to production of the necessary lower temperature limit of 3,000° F. Usually no more than about 70 percent combustion is required to produce the necessary heat. The preferred operating temperature for the process appears to be about 3,200° F. to about 3,400° F. but the temperature in the reactor may be higher. Higher temperatures do not adversely affect the process, but are hard on reactor linings.

The discovery is applicable to all of the alkaline earth metals. Thus, the invention contemplates the introduction of calcium, barium, strontium or magnesium or mixtures thereof as metal or as compounds into the reaction mass. Where compounds are employed, they may be introduced as solids in suspension, as slurries in a dispersion liquid (e.g., water or organic carrier liquid) or as water or organic solvent solutions. Organic or inorganic compounds, such as organic acid salts, mineral acid salts and hydroxides are contemplated, but the halides, and especially the chlorides, are preferred on account of their ready availability, water solubility and reasonable cost. The amount of alkaline earth metal may be varied in accordance with the extent of surface area development desired. However, it is critical that the metal be dispersed in the feedstock in a weight concentration of at least about 0.2 percent on the feedstock. Ordinarily, no more than 4 percent of the metal is required, but larger amounts may be used if warranted by product specifications and the quality of the reactor lining. The alkaline earth metal may be injected into the reactor at any position(s) that will result in good dispersion of the metal in the reaction mass and satisfy the contact time requirements of the process. In this connection, it should be noted that the injector should be placed far enough upstream of any quench sprays in the reactor to insure the minimum contact time is satisfied before the reaction mass is quenched.

Where the alkaline earth metal is calcium, strontium or magnesium and it is desired to avoid the structure-degrading effect thereof, the metal(s) should be injected downstream of the restriction between the two zones of the reactor. Preferably the injection is made immediately downstream of the restriction, since the maximum contact time is thus obtained in a reactor of a given length. In longer reactors, the metal injection means may be located well downstream of the restriction. In such case care should be exercised to see that the cooling means (e.g., water, steam or dry quench) is located a substantial distance downstream of the metal injector. By a substantial distance is meant a distance which is long enough to provide a contact time between the reaction mass and the metal which falls within the above-mentioned time interval.

Where the alkaline earth metal is barium, it may be injected into either the first or second zone. When barium is used, it is preferably injected at the upstream end of the first zone as a separate stream or spray alongside the feedstock. Maximum contact time between the barium and the reaction mass is thereby obtained.

The use of barium in admixture with one or more of the other alkaline earth metals offers the advantage of attaining fine control over both the surface area and the structure level of the product. For instance, it is possible to inject both barium and calcium into the first zone. The spray angle of the feedstock is set to produce approximately the desired structure level and the combined rate of introduction of barium and calcium is set to produce the desired level of surface area. Then, a fine adjustment in the structure level is made by varying the proportion of barium and calcium being charged. Barium has little or no effect on structure when used within the concentration limits set forth herein. Calcium, on the other hand, if injected into the first zone, does have substantial effects on structure. Both barium and calcium have substantial effects on surface area. Thus, a substantial change in the ratio of barium to calcium will exert a substantially greater influence on structure than on surface area. Thus, by substantially varying the ratio of barium to calcium it is possible to make fine adjustments in structure level with only very small changes in surface area. If such changes in surface area are more than production goals will tolerate, such changes may be corrected by a further change in the combined rates of barium and calcium addition. It will, of course be possible to change the combined rate of barium addition and calcium addition while simultaneously altering the ratio of such additions, and such practice is also contemplated by the invention. Generally speaking, the technique just described is useful throughout a range in which the charging ratio of barium to total alkaline earth metal (including barium) varies from about 0.05 to about 0.95 in terms of weight.

If the contact time between the alkaline earth metal and the reaction mass falls significantly below about 10 milliseconds, the objects of the invention are not attained. Contact times of more than 70 milliseconds are not prescribed. However, at the high combustion and flow rates required to maintain temperatures above 3,000° F., contact times much in excess of 70 milliseconds can only be attained by substantially increasing the internal dimensions and therefore the costs of one's reactors.

From the above discussion it will be apparent that the lower limits of temperature, percentage combustion of feedstock, feedstock spray angle, concentration of alkaline earth metal, and contact time set forth in this specification and in the appended claims, are critical. If any of those conditions falls significantly below the particular minimum value which has been set forth herein, the objects of the invention are not attained. Persons skilled in the art will readily recognize, however, that the upper limits on these variables are limits of convenience and economy rather than of operability in the absolute sense. It should also be apparent that an increase in any of such variables increases the product property governed thereby. For instance, feedstock spray angle is substantially the governing process variable for the structure of the product. An increase in spray angle under a given set of other conditions increases structure. Temperature, alkaline earth metal concentration and contact time largely govern the surface area of the product. Thus, an increase in any of them increases the surface area of the product; provided the other two variables remain constant. In like fashion a decrease in a variable governing a particular property will decrease the extent of development of that property in the product. Therefore, the process is not operated with all three of the governing variables for surface area at their minimum value. If any two of them are in about the lower one-fifth of their specified ranges, the remaining variable should be maintained in about the upper one-third of its specified range. For instance, if contact time and alkaline earth metal are in the lower one-fifth of their specified range, e.g., 20 milliseconds and 1 percent respectively, then the temperature should be in about the upper one-third of its range, e.g., about 3,300° F. or higher. Applying the above principles, persons skilled in the art will readily manipulate the various variables to obtain the novel products of the present invention.

The products of the present invention are characterized by a unique combination of properties which have never before been obtained in furnace carbon black as it is produced in a furnace-type carbon black reactor. Although it was reported in the art that various after treatments of impingement or channel black (surface area about 110 m.²/gram) were able to raise its surface area to about 1,000 m.²/gram, resulting in an objectionable thixotropy, surface areas of about 450 m.²/gram have been considered extraordinarily high for carbon black recovered from the furnace process. In contrast, the blacks produced in accordance with this invention have a surface area in the range of from about 600 m.²/gram to about 1,300 m.²/gram. While oil factors of about 185 ml. oil per 100 grams of carbon black have been considered unusually high in the past, the carbon blacks of the present invention exhibit oil factors in the range of about 250 ml. to about 450 ml. per 100 grams of carbon black. Prior art channel blacks as originally produced, are normally characterized by relatively high contents of volatile matter, e.g., 4-15 percent, while the high-structure, high-surface area furnace carbon blacks of the present invention, as initially produced, normally exhibit a volatile content well below about 2½ percent, e.g., 1½ percent. While prior art channel blacks display a definitely acid pH, e.g., about 2-3, the blacks of the present invention exhibit a pH in the range of about 6 to about 10, and are thus substantially neutral to alkaline. The carbon blacks of the present invention exhibit an ash content in the range of at least about 0.5 percent to about 10 percent, while impingement or channel carbon blacks normally had only a trace, e.g., less than 0.1 percent, of ash. In their preferred form, the products of the invention display a pH of about 6.5 to about 9.5, an oil factor of about 300 to about 400 ml. per 100 grams of carbon black and a surface area of about 700 to about 1,100.

The invention may be better understood by considering certain illustrative embodiments thereof, one of which will now be disclosed with the aid of the accompanying drawings, in which:

FIG. 3 is a graph of a discharge curve of organic depolarized systems containing acetylene black and the carbon black of the present invention.

The reactor in which it is particularly preferred to carry out the invention is quite similar to that shown in U.S. Pat. Nos. 3,060,003 and 3,222,131, but is slightly modified in respect to burner design and provision of means for injection of alkaline earth metal. In all other respects, the reactor is capable of operating in the same manner as the one shown in the aforementioned patents, and the disclosures of said patents are incorporated herein by reference, it being understood that resort may be had to the disclosures thereof for information not given herein. The reactor shown in said patents is adapted to direct a linear flow of a burning mixture of fuel and a combustion-supporting oxygen-bearing gas through a first zone toward a second zone. At the same time, a second flow comprising feedstock is directed along the axis of the first zone toward the second zone, the flow being introduced into the first zone in the form of a conical spray, the angle of which is preselected to produce a carbon black of preselected structure. The two flows are intimately mixed and enter the second zone. The feedstock is thermally decomposed to carbon black, the carbon black being recovered from the second zone.

Figure 1:
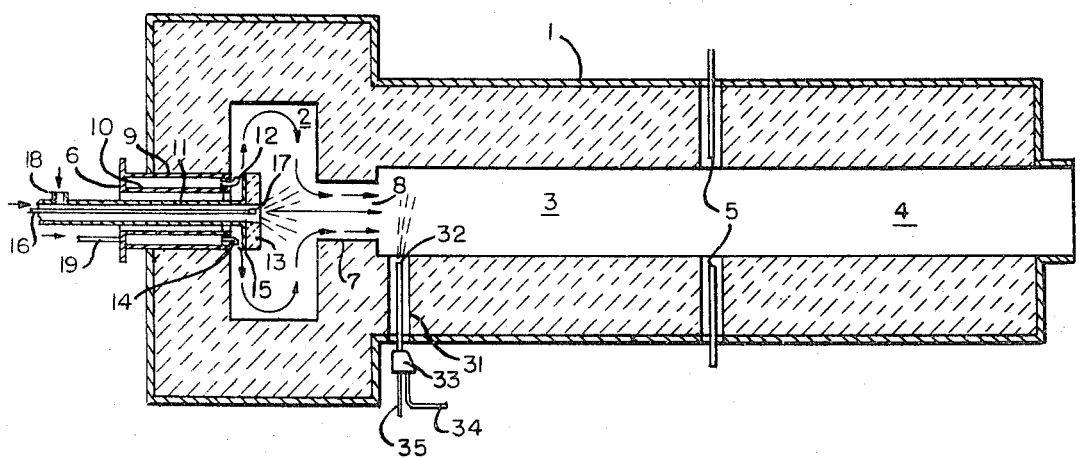
FIG. 1 is a sectional view of a reactor adapted to carry out the process and to produce the novel products of the invention.
Figure 2:
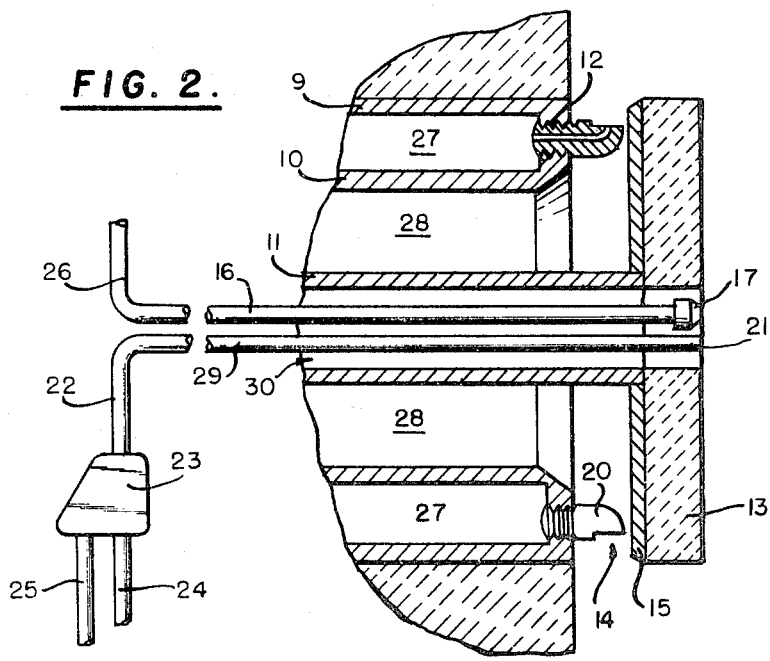
FIG. 2 is an enlarged portion of FIG. 1.

For a more complete understanding of said reactor, reference is made to FIGS. 1 and 2 of the accompanying drawing. Reference numeral 1 thereof denotes a generally tubular reactor which is divided as shown into a first chamber or zone 2, a second chamber or zone 3 and a quench chamber or zone 4 having quench ports 5. As illustrated, the quench zone constitutes merely an extension of the second zone and is of substantially similar configuration. The first zone, however, is of greater diameter and shorter length than the second zone. For optimum results, moreover, it is preferred that the diameter of the first zone be greater than its length, although this is not a necessary limitation for practice of the method of this invention.

First zone 2 is provided with an inlet opening through which injector assembly 6 projects thereinto, while quench zone 4 is provided with an outlet opening for withdrawal of reaction products. Positioned in the inlet end of the second zone is a replaceable choke ring 7 of a high-temperature refractory material having an orifice 8, the length, diameter and overall shape of which may vary. Each of the zones and their inlet and outlet openings is formed by a high-temperature refractory liner backed up by a castable refractory insulation, the entire reactor in turn having an outer steel shell or casing.

Injector assembly 6 comprises substantially tubular members 9, 10 and 11, members 9 and 10 supporting a heat resistant ring member 12 between their inner ends. Fixed to the end of member 11 and positioned within the first zone is a circular deflector 13 having a diameter substantially equivalent to that of member 9. The position of deflector 13 within the first zone may be adjusted by means not shown, so as to provide a circumferential orifice 14 of desired width, the orifice being formed on the one side by ring member 12 and on the other side by the deflector. As are all surfaces that are subjected to the high combustion and decomposition temperatures, the deflector is constructed of a high-temperature refractory material, the inner surface of which is further provided with a heat resistant stainless steel insert 15.

Extending through tubular member 11 is a hydrocarbon feedstock conduit 16 provided at its inner end with a nozzle or injector 17 adapted to inject the feedstock into zone 2 in the form of a vaporized or atomized spray. Connected to zone 2 through tubular member 11 is a source of oxygen-bearing, combustion-supporting gas, referred to herein as "axial air," which serves to support in part, the combustion of the fuel and/or feedstock. In like manner, a source of an oxygen-bearing combustion supporting gas, herein referred to as "process air," for supporting combustion of the fuel in zone 2 is connected to zone 2 through circumferential orifice 14 and conduit 10. Communicating with zone 2 through orifice 14 is a source of fuel for providing the heat to sustain thermal cracking of the feedstock. The particular means for injecting the fuel into zone 2 may take various forms, a particularly effective arrangement comprising a conduit 19 connecting the source of fuel to the interior of enclosed space 27 between tubular members 9 and 10. Ring 12 constitutes one end of space 27 and it is provided with a plurality of gas jets 20 which are secured at angularly spaced intervals around the front face of ring 12. The jets communicate with the enclosed space 27. The jets are directed outwardly so as to project the fuel toward the circumferential surface of zone 2.

An alkali metal compound injector pipe 29 is provided. See FIG. 2; the pipe 29 has been omitted from FIG. 1 to simplify the drawing. Pipe 29 extends alongside the feedstock pipe 16 in tubular member 11 and has its outlet adjacent feedstock spray nozzle 17. Pipe 29 is connected through supply pipe 22 with an atomizer 23 which in turn is connected through pipe 25 with a source (not shown) of alkaline earth metal solution under pressure, and through pipe 25, with a source (not shown) of high-pressure air for atomizing the alkaline earth metal solution.

In accordance with the invention, the reactor disclosed herein is also provided with a racial port 31 through the metal casing and refractory lining of the furnace opening into the second zone 3 immediately downstream of restriction or choke 7. In port 31 is an alkali metal injection pipe 32 having its inner end slightly within the inner end of port 31 and having its outer end connected to atomizer 33. The latter, in turn, is connected through pipe 35 with a source (not shown) of alkaline earth metal solution under pressure, and through pipe 34 with a source (not shown) of high-pressure air for atomizing the alkaline earth metal solution.

During the operation of the above-described reactor, a continuous stream of process air is injected into circumferential orifice 14 and flows radially outward passing the jets 20, at which point it is at its maximum velocity and minimum static pressure. Simultaneously, a stream of hydrocarbon fuel is injected into orifice 14 through jets 20 resulting in a thorough and rapid mixing thereof in the process airstream. The resultant fuel-air mixture is ignited as it passes into zone 2, the burning mixture and its products of combustion flowing radially outward from the axis thereof as a uniformly expanding disc-shaped stream. It then follows a flow pattern as determined by the configuration of zone 2 and as shown by the arrows in the drawing, flowing substantially parallel to the circumferential surface of said zone towards the opposite end thereof where it is directed radially inward toward the axis of the zone and orifice 8.

As hydrocarbon fuel and process air are introduced into the reactor, hydrocarbon feedstock is injected into zone 2 through injector nozzle 17 in the form of a vaporized or atomized spray cone. Alkaline earth metal solution is introduced to the interior of the reactor through injection pipe 29 and/or injection pipe 32 and is rapidly dispersed in the reaction mass. The temperature of the feedstock is rapidly raised as it approaches orifice 8 and it is thoroughly mixed with and dispersed in the hot combustion gases resulting from the burning of the hydrocarbon fuel. The resultant mixture of combustion products, alkaline earth metal (when pipe 29 is used) and feedstock passes through orifice 8 into zone 3, cracking of the feedstock being terminated in zone 4 by quenching with water or other suitable cooling medium introduced through quench ports 5. The cooled reaction gas with entrained carbon black then exits from zone 4 for subsequent separation and collection of carbon black.

In order to demonstrate to those skilled in the art the preferred manner of carrying out the process of this invention, the following examples are given. All parts are parts by weight unless the contrary is clearly indicated. The examples are presented primarily by way of illustration, and the descriptions of various details therein are not to be interpreted as limitations upon the invention except to the extent required by the appended claims. Considerable variation is possible. For instance, although the reactor employed in carrying out the examples is the one shown in the accompanying drawing and description, the art can readily practice the invention in other reactors within the applicable class discussed herein. Although a particular feedstock and particular conditions tending to produce a particular grade of carbon black have been set forth for the sake of concreteness, persons skilled in the art can readily substitute other feedstocks and select different combinations of operating conditions, all in accordance with well-known principles. Other variations will readily occur to those having experience in the art of producing carbon black.

The dimensions of the reactor used in the examples are as follows:

| | |
|---|---|
| First Zone | |
| Diameter | 36 inches |
| Length | 15 inches |
| Air Inlet Annulus | |
| Diameter | 12 inches |
| Width | ¾ inch |
| Restriction Ring | |
| Internal Diameter | 7 inches |
| Length | 9 inches |
| Second Zone | |
| Diameter | 15 inches |
| Length | 10 feet, 6 inches |
| Additive Injector 32 | |
| Distance of pipe from downstream face of restriction | ½ inch (approx.) |
| Quench Sprays | |
| Distance from additive injector 32 | 10 feet, 5½ inches (approx.) |

A hydrocarbon feedstock having approximately the following analysis is employed in the examples:

| | |
|---|---|
| Gravity, API at 60° F. | 2.5 |
| Viscosity, SU sec./210° F. | 43.6 |
| Conradson Carbon, percent | 6.42 |
| Correl. Index | 116 |
| Distillation: | |
| IBP° F., 760 mm. | 463 |
| 5% | 632 |
| 10% | 674 |
| 20% | 700 |
| 30% | 704 |
| 40% | 721 |
| 50% | 739 |
| | oil began to crack |

Natural gas having a B.t.u. rating of about 1,050 B.t.u./ft.$^3$ net is employed as fuel with ambient air, as the combustion-supporting gas.

The pipe 32 for injecting the additive into the second zone of the reactor was a ¼-inch IPS stainless steel pipe extending to within 1 inch of the wall of said zone.

The oil absorption tests employed in the examples of this application are conducted in accordance with the procedure set forth in lines 33–47 of column 8 of U.S. Pat. No. 3,222,131.

Where iodine numbers are referred to in the examples they were determined by the following procedures: 0.3333 grams of carbon black are placed in a flask; 10 ml. of 0.479 N iodine solution and 40 ml. of water are added to the carbon black, the mixture is shaken 30 seconds, then allowed to stand 5 minutes. The mixture is then filtered and 20 ml. of the filtrate are titrated with standardized sodium thiosulfate solution to the usual iodine endpoint using starch solution indicator. A "-blank" solution of 10 ml. 0.479 N iodine solution and 40 ml. of distilled water is prepared, and 20 ml. of this "blank" solution is titrated with the same sodium thiosulfate solution as used with the filtrate. The iodine number is computed as follows: iodine number = 3 × normality of sodium thiosulfate × 317.26 × ($B-S$). $B$ is the number of ml. of sodium thiosulfate required to titrate the blank and $S$ is the number of ml. of sodium thiosulfate required to titrate the filtrate from the sample.

EXAMPLE 1

In this example, the reactor was operated at a combustion air rate of 190,000 s.c.f.h., a natural gas rate of 12,260 s.c.f.h., a feedstock rate of 140.75 g.p.h. (metered at 60° F.), a feedstock preheat temperature of 450° F. (at the reactor), and a feedstock spray angle of 120° (solid cone spray). Eight gallons per hour of CaCl$_2$ solution (35 lb./100 gal.) was atomized with 500 s.c.f.h. of air and introduced through injector pipe 32. Under these conditions, about 54 percent of the feedstock was burned and a temperature of about 3,200° F. was attained in the reactor. The resultant product had an ash content of about 2.5 percent. The yield was 2.02 pounds of carbon black per gallon.

EXAMPLE 2

The procedure of example 1 was repeated, except that the feedstock rate was changed to 97 g.p.h., the gas rate was changed to 15,200 s.c.f.h., and the percent combustion of the feedstock was about 60 percent. The oil preheat temperature was 400° F. Five gallons per hour of CaCl$_2$ solution (66.7 lbs./100 gal.) atomized with 1,000 s.c.f.h. of air was employed. The ash content of the resultant product was about 3.5 percent. The material recovered from the reactor was found to have a pH of about 7.4.

EXAMPLE 3

The procedure of example 1 is repeated, except that 1 g.p.h. of CaCl$_2$ solution (66.7 lbs./100 gal.) and 4 g.p.h. of BaCl$_2$ solution (50 lbs./100 gal.) are metered into the reactor through injector pipe 29. Similar results are obtained.

EXAMPLE 4

The procedure of example 1 is repeated, substituting MgCl$_2$ and SrCl$_2$ for the CaCl$_2$. Similar results are obtained.

EXAMPLE 5

Commercially available acetylene black and the products of a number of runs in accordance with the process of the invention are gathered and tested for surface area by iodine adsorption and for structure by oil factor. The results appear in the following table:

TABLE I

| Carbon Black | Iodine Surface Area | Oil Absorption cc. 100 g. |
| --- | --- | --- |
| A. (Acetylene Black) | 80 | 290 |
| B. | 1,018 | 380 |
| C. | 1,171 | 300 |
| D. | 982 | 247 |
| E. (Product of Ex. 1) | 859 | 338 |
| F. | 701 | 280 |
| G. | 715 | 290 |
| H. (Product of Ex. 2) | 950 | 298 |
| I. | 1,023 | 290 |

EXAMPLE 6

A cathode mix for an organic depolarized cell was prepared in accordance with the following procedure:

1. Grind 100 grams meta dinitrobenzene and 4.5 grams barium chromate together with a small portion of a 50 gram sample of the above acetylene carbon black until free of lumps of m-DNB.
2. Blend the above mixture and the remaining carbon in a blender for 5 minutes.
3. Add 225 ml. of electrolyte which consists of a 2.5 N magnesium perchlorate solution containing 0.2 gram of lithium chromate per liter.
4. The mixture is kneaded until a moist crumb is obtained.

The moist crumb was placed in a cylindrical container of plexiglass having a magnesium anode plate at one end. A conventional coated paper separator is placed between the anode plate and the cathode mix. It serves as a conducting medium when wetted by the electrolyte solution. At the other end of the container is a carbon rod which is embedded in the cathode mix and extends through the end wall to the positive terminal of the cell. It serves as a collector of electric current from the anode and also is sufficiently porous to permit the escape of gas from the container which, except for the porosity of the carbon collector, is tightly sealed.

EXAMPLE 7

Example 6 is repeated except that the carbon black produced in accordance with Example 1 is substituted for the acetylene black.

EXAMPLE 8

The cells prepared in accordance with Examples 6 and 7 were discharged at a 16⅔ ohm drain rate which was selected as a reasonable simulation of the type of load to which such cells might be subjected in normal use. The performance of the cells is illustrated graphically in FIG. 3 and in the following table:

TABLE II

| Cell | No-Load Voltage | Time to 0.9 volt (min.) | Power to 0.9 volt (watt-hr.) | Amp.-hr. to 0.9 volt |
| --- | --- | --- | --- | --- |
| Ex. 6 Acetylene Black | 1.60 | —* | —* | —* |
| Ex. 7 Furnace Carbon Black of present invention | 1.825 | 582 | 0.615 | 0.6 |

*cell with acetylene black never attained 0.9 volt.

As may be seen from the graph in FIG. 3 and the data in Table II, the furnace carbon black produced in accordance with the present invention proved superior to the acetylene black.

I claim:

1. A cathode mixture comprising a cathode compound that is reducible in a cell for the production of electric current and, in admixture with said cathode compound, an amount of a furnace carbon black having a surface area (iodine adsorption) of about 600 m.²/gram to about 1,300 m.²/gram, a structure level as measured by oil factor of about 250 to about 450 milliliters per 100 grams of carbon, pH of about 6 to about 10, and an ash content of about 0.5 percent to about 10 percent which is sufficient to enhance the conductivity of the mixture and retain a substantial proportion of the electrolyte upon its surface when said cathode mixture is employed in a cell.

2. The cathode mixture of claim 1 wherein the surface area (iodine adsorption) of the furnace carbon black is about 700 to about 1,100.

3. The cathode mixture of claim 1 wherein the oil factor of the furnace carbon black is about 300 to about 400.

4. The cathode mixture of claim 1 wherein the pH of the furnace carbon black is about 6.5 to about 9.5.

5. The cathode mixture of claim 1 wherein the furnace carbon black has a particle size of about 15–22 millimicrons.

6. The cathode mixture of claim 1 wherein the furnace carbon black has a volatile content as initially produced of below about 2– percent. 2½

7. The cathode mixture of claim 1 wherein the furnace carbon black has a surface area of about 700 to about 1,100, an oil factor of about 300 to about 400 and a pH of about 6.5 to about 9.5.

8. The cathode mixture of claim 7 wherein the furnace carbon black has a particle size of about 15–22 millimicrons.

9. The cathode mixture of claim 8 wherein the furnace carbon black has a volatile content as initially produced of below about 2½ percent.

10. The cathode mixture of claim 1 which contains a substantial portion of an organic depolarizer.

11. The cathode mixture of claim 10 wherein the furnace carbon black has a particle size of about 15–22 millimicrons.

12. The cathode mixture of claim 10 wherein said organic depolarizer is meta dinitrobenzene.

13. The cathode mixture of claim 12 which further contains barium chromate.

14. A cell which contains the cathode mixture of claim 1.

15. A cell which claims the cathode mixture of claim 15.

16. A cell which contains the cathode mixture of claim 10.

* * * * *

UNITED STATES PATENT OFFICE
CERTIFICATE OF CORRECTION

Patent No. 3,637,436           Dated January 25, 1972

Inventor(s) Fletcher A. Hinson, Jr.

It is certified that error appears in the above-identified patent and that said Letters Patent are hereby corrected as shown below:

Column 9, Line 50;     For "racial" read -- radial --.

Column 13, Line 21;    In Claim 6, the phrase "2-percent. 2 1/2" should read -- 2 1/2 percent --.

Column 14, Line 19;    In Claim 15 the phrase "claim 15" should read -- claim 5 --.

Signed and sealed this 6th day of March 1973.

(SEAL)
Attest:

EDWARD M. FLETCHER, JR.          ROBERT GOTTSCHALK
Attesting Officer                 Commissioner of Patents